(12) United States Patent
Ippatapu et al.

(10) Patent No.: US 11,316,907 B2
(45) Date of Patent: Apr. 26, 2022

(54) SYSTEM AND METHOD FOR SECURE COMMUNICATION CHANNEL ESTABLISHMENT

(71) Applicant: EMC IP Holding Company LLC, Hopkinton, MA (US)

(72) Inventors: Venkata L. R. Ippatapu, Westborough, MA (US); Kenneth M. Dorman, West Brookfield, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 200 days.

(21) Appl. No.: 16/706,636

(22) Filed: Dec. 6, 2019

(65) Prior Publication Data

US 2021/0176283 A1 Jun. 10, 2021

(51) Int. Cl.
*H04L 29/06* (2006.01)
*H04L 29/08* (2006.01)
*H04L 67/1095* (2022.01)

(52) U.S. Cl.
CPC ........ *H04L 63/205* (2013.01); *H04L 63/0428* (2013.01); *H04L 63/18* (2013.01); *H04L 67/1095* (2013.01)

(58) Field of Classification Search
CPC ............... H04L 63/205; H04L 67/1095; H04L 63/0428; H04L 63/18
See application file for complete search history.

(56) References Cited

U.S. PATENT DOCUMENTS

| | | | | |
|---|---|---|---|---|
| 7,305,700 | B2 * | 12/2007 | Boynton | H04L 9/3226 726/4 |
| 2005/0102514 | A1 * | 5/2005 | Bergenwall | H04W 12/0433 713/168 |
| 2006/0015935 | A1 * | 1/2006 | Dixon | H04L 63/0218 726/11 |

(Continued)

OTHER PUBLICATIONS

"Internet Security Association and Key Management Protocol (ISAKMP)"—Maughan etal, National Security Agency, Security, Inc., Raba Technologies, Inc., Nov. 1998 http://www.networksorcery.com/enp/rfc/rfc2408.txt (Year: 1998).*

(Continued)

*Primary Examiner* — Randy A Scott
(74) *Attorney, Agent, or Firm* — Chamberlain, Hrdlicka, White, Williams & Aughtry

(57) ABSTRACT

Embodiments described herein relate to techniques for establishing a secure communication channel. The techniques may include performing an encryption capability negotiation between peer devices, wherein a first peer device and a second peer device are connected by a communication channel comprising a first link of the first peer device and a second link of the second peer device; marking, when the encryption capability negotiation is successful, the first link and the second link as encryption capable; performing, based on the marking, a security negotiation between the first peer device and the second peer device; based on the security negotiation: establishing a first security association on the first peer device; and establishing a second security association on the second peer device; programming the first security association to hardware of the first peer device; and programming the second security association to hardware of the second peer device.

16 Claims, 4 Drawing Sheets

(56) References Cited

U.S. PATENT DOCUMENTS

2008/0101598 A1\* 5/2008 Dillaway ............... H04L 63/20
380/44
2009/0034557 A1\* 2/2009 Fluhrer ............... H04L 63/0272
370/474

OTHER PUBLICATIONS

"Secure Negotiation for Manual Authentication Protocols"—Milutinovic et al., HAL Open Science, Sep. 27, 2017 https://www.immagic.com/eLibrary/ARCHIVES/TECH/IETF/RFC2408.pdf (Year: 2017).\*

\* cited by examiner

SYSTEM AND METHOD FOR SECURE COMMUNICATION CHANNEL ESTABLISHMENT

BACKGROUND

Devices may be configured to exchange data with peer devices using secure communication channels. However, some peer devices may not include support for such channels and/or there may be circumstances associated with the operative connection between peer devices that would make establishment of a secure communication channel potentially detrimental to performance of communication sent via the communication channel being secured.

SUMMARY

In general, in one aspect, embodiments described herein relate to a method for establishing a secure communication channel. In one or more embodiments, the method includes performing an encryption capability negotiation between a first peer device and a second peer device, wherein the first peer device and the second peer device are operatively connected by a first communication channel comprising a first link of the first peer device and a second link of the second peer device; marking, when the encryption capability negotiation is successful, the first link and the second link as encryption capable; performing, based on the marking, a first security negotiation between the first peer device and the second peer device; based on the first security negotiation: establishing a first security association on the first peer device; and establishing a second security association on the second peer device; programming the first security association to first data transmission hardware of the first peer device; and programming the second security association to second data transmission hardware of the second peer device.

In general, in one aspect, embodiments described herein relate to a non-transitory computer readable medium comprising computer readable program code, which when executed by a computer processor enables the computer processor to perform a method for establishing a secure communication channel. In one or more embodiments, the method includes performing an encryption capability negotiation between a first peer device and a second peer device, wherein the first peer device and the second peer device are operatively connected by a first communication channel comprising a first link of the first peer device and a second link of the second peer device; marking, when the encryption capability negotiation is successful, the first link and the second link as encryption capable; performing, based on the marking, a first security negotiation between the first peer device and the second peer device; based on the first security negotiation: establishing a first security association on the first peer device; and establishing a second security association on the second peer device; programming the first security association to first data transmission hardware of the first peer device; and programming the second security association to second data transmission hardware of the second peer device.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
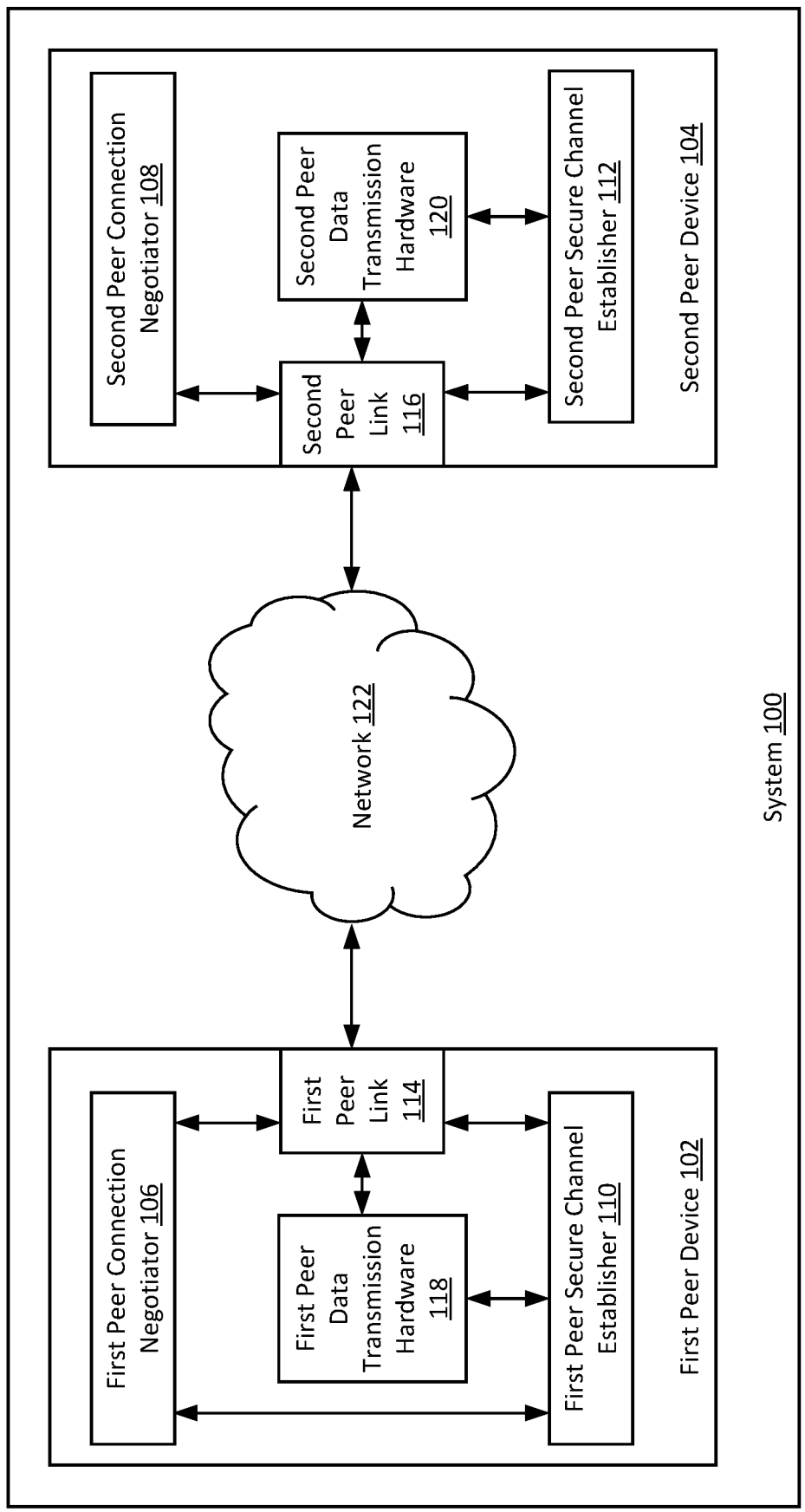
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to systems, devices, and methods for providing secure communication channels between peer devices, or not doing so when appropriate. A given device (e.g., a computing device) may have any number of physical ports for exchanging information with other devices. In order to facilitate secure communication of such data, secure communication channels may be established between the devices (e.g., using Internet Key Exchange (IKE) sessions). However, certain situations may exist for which a secure channel should not be established. For example, one or the peer devices may not have adequate support for the security protocols, encryption types, compression types, etc. to facilitate successful establishment of the secure communication channel. As another example, devices (e.g., Wide Area Network (WAN) optimizers) within the communication channel may exist and include functionality that, if combined with a secure communication channel established between peer devices, potentially degrade the performance of the communication channel (e.g., double encryption of network data traffic units adding unnecessary latency in the communication channel). In such situations, it may be advantageous to proactively not set up a secure communication channel between peer devices.

Additionally, certain secure communication channel establishment protocols (e.g., Internet Key Exchange) may be configured to set up the secure communication channel with an understanding that one peer device is to be considered an initiator, while the other peer device is to be considered the responder. Such an understanding may allow for designation of either peer device having either role, which may avoid establishing unnecessarily redundant secure communication channels between peers.

Additionally, in one or more embodiments, there exist multiple communication channels (e.g. Transmission Control Protocol links) between the same two peer devices. In such scenarios, one or more embodiments may establish a separate secure communication channel with unique Security Association parameters for each communication channel between the peer devices, rather than the usage of same Security Association parameters for all secure communication channels between the same two peer devices.

Accordingly, one or more embodiments described herein offers a resilient link establishment solution by establishing communication secure channels only on encryption capable links between local and remote peer devices. Additionally, one or more embodiments establish a granular secure communication channel session per connection allowing multiple secure channels for a given link between peer devices. Additionally, one or more embodiments prevent data compression on encrypted data performed by devices (e.g., WAN optimizers) existing between devices, potentially mitigating a negative impact on performance.

FIG. 1 shows a system (100) in accordance with one or more embodiments described herein. As shown in FIG. 1, the system (100) includes peer devices (e.g., first peer device (102), second peer device (104)) and a network (122). In one or more embodiments, a peer device incudes a peer connection negotiator (e.g., first peer connection negotiator (106), second peer connection negotiator (108)), a peer secure communication channel establisher (e.g., first peer secure communication channel establisher (110), second peer secure communication channel establisher (112)), any number of peer links (e.g., first peer link (114), second peer link (116)), and peer data transmission hardware (e.g., first peer data transmission hardware (118), second peer data transmission hardware (120). Each of these components is described below.

In one or more embodiments, a peer device (102, 104) is any device (e.g., a computing device) having one or more peer links (114, 116) through which information may be received and/or transmitted, and also including functionality for establishing, when appropriate, one or more secure communication channels with other peer devices. For example, a peer device (102, 104) may be a replication device that includes functionality to replicate data to another replication device (e.g., for disaster recover, data redundancy, etc.).

In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), persistent storage (not shown), one or more physical interfaces (e.g., network ports) (not shown), any number of other hardware components (not shown) and/or any combination thereof. Examples of computing devices include, but are not limited to, a server (e.g., a blade-server in a blade-server chassis, a rack server in a rack, etc.), a storage device (e.g., a data replication device, a fibre channel device, an iSCSI device, an Infiniband device, any combination thereof, etc.) a desktop computer, a mobile device (e.g., laptop computer, smart phone, personal digital assistant, tablet computer and/or any other mobile computing device), a network device (e.g., switch, router, multi-layer switch, etc.), a virtual machine, and/or any other type of computing device with the aforementioned requirements.

In one or more embodiments, the persistent storage (not shown) and/or memory (not shown) of a system (100) may be one or more data repositories for storing any number of data structures storing any amount of data (i.e., information). In one or more embodiments of the invention, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage (not shown) and/or memory (not shown) of a system (100) may be considered, in whole or in part, as non-transitory computer readable mediums storing software and/or firmware.

Such software and/or firmware may include instructions which, when executed by the one or more processors (not shown) or other hardware (e.g. circuitry) of a system (100), cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, a peer device (102, 104) includes any number of peer connection negotiators (e.g., first peer connection negotiator (106), second peer connection negotiator (108)). In one or more embodiments, a peer connection negotiator (106, 108) is any hardware (e.g., circuitry), software, firmware, or any combination thereof that includes functionality related to establishing a connection with a peer device, which may include negotiation of encryption capabilities between the peers (discussed further in the description of FIG. 2, below). In one or more embodiments, a peer connection negotiator includes functionality to negotiate and agree on encryption capabilities, or lack thereof, with peer devices, and to mark links for which the negotiation was undertaken as either encryption capable or not encryption capable based on the results of the negotiation. In one or more embodiments, an encryption capable link is one for which a secure communication channel may be established, while a non-encryption capable link is one for which any data transferred would be transferred via an unsecure communication channel. In one or more embodiments, a peer connection negotiator (106, 108) may be designated as either an initiator or a responder. Such a designation may be made based on any information. Examples of such information include, but are not limited to, which connection negotiator was first to seek to establish a communication channel with a peer device, whether a peer device (102, 104) on which a connection negotiator executes has a higher or lower serial number (e.g., identifier) than that of the peer device, etc.

In one or more embodiments, a peer device (102, 104) includes any number of secure channel establishers (e.g., first peer secure channel establisher (110), second peer secure channel establisher (112)). In one or more embodiments, a secure channel establisher (110, 112) is any hardware (e.g., circuitry), software, firmware, or any combination thereof that includes functionality related to establishing a secure channel. For example, a secure channel establisher (110, 112) may be an IKE module configured to negotiate with a peer device using the IKE process (security key exchange, peer authentication, etc.) to establish and program to hardware security associations, thereby establishing a secure communication channel.

Continuing the above example, a secure communication channel may be created using the Internet Protocol (IP) security (IPsec) protocol. In one or more embodiments, IPsec uses a procedure to establish a secure communication channel between peer devices. To that end, a secure channel establishment protocol (e.g., Internet Key Exchange (IKE)) may be used. In one or more embodiments, IKE uses UDP packets to create security associations, which are a set of logical security parameters to help secure data that is being exchanged between peer devices. Such parameters may include specified cryptographic algorithms, pre-shared or generated cryptographic keys, and/or any other security related parameters (e.g., authentication parameters), and each of these items may be defined by a security policy. In one or more embodiments, IKE's use of UDP packets to establish a secure communication channel requires the use of UDP sockets. In one or more embodiments, a socket is an internal endpoint for sending and/or receiving data over a network. In one or more embodiments, a socket is defined by the combination of a network address (e.g., an IP address) and a port number. A system (110) may have any number of sockets for exchanging data with peer devices without departing from the scope of embodiments described herein.

In one or more embodiments, a peer device (102, 104) includes any number of peer links (114, 116). In one or more embodiments, a peer link (114, 116) is any hardware (e.g., circuitry), software, firmware, or any combination thereof that includes functionality related to transmitting data of any type between peer devices (102, 104). In one or more embodiments, a peer link may include a physical port, be part of a shared physical port, and/or include any relevant software and/or hardware constructs related to data transmission (e.g., IP interfaces, TCP ports, protocol sockets, etc.). In one or more embodiments, a physical port is hardware for sending and/or receiving data to/from a peer device (102, 104). In one or more embodiments, a port is a wired or wireless port that connects a peer device (102, 104) to other devices (e.g., remote peer devices). For example, a port may be a port configured to accept insertion of an Ethernet cable, and to transmit and/or receive data using such a wire.

In one or more embodiments, a single peer link exists between two given peer devices. In other embodiments of the invention, there may exist multiple peer links on a peer device, each operatively connected to a corresponding peer link on a same other peer device.

In one or more embodiments, a peer link (114, 116) is operatively connected to at least one peer connection negotiator (106, 108) to facilitate the negotiation of connections between peers. For example, a peer connection negotiator (106, 108) may use a peer link (114) to send and receive messages to a peer device to determine if the peer link of the peer device to which the peer link is operatively connected has matching security capabilities, such as encryption/decryption, security protocol support, compression algorithm support, etc.

In one or more embodiments, a peer link (114, 116) is operatively connected to at least one secure channel establisher (110, 112) to facilitate the negotiation related to and establishment of a secure communication channel between peers. For example, a secure channel establisher (110, 112) may use a peer link (114, 116) to send and receive messages (e.g., IKE messages) to a peer device to exchange encryption keys (e.g., using a Diffie-Hellman key exchange), negotiate security policies, authenticate peer identities, etc.

In one or more embodiments, peer links (114, 116) exist as part of an operative connection between peer devices (102, 104). Such an operative connection may also include a network (122). In one or more embodiments, a network may be an entire network or any portion thereof (e.g., a logical portion of network devices within the network topology, external to the network topology, etc.). A network (122) may include a datacenter network, a WAN, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, an application (not shown) transmits and/or receives data via peer links (114, 116) of the system to/from operatively connected peer devices. In one or more embodiments, an application (not shown) transmits and/or receives data using an upper level protocol. Examples of such protocols include, but are not limited to, iSCSI, replication applications, fibre channel, etc. In one or more embodiments, any applications that use the same underlying physical data transmission scheme may share a given peer link (114, 116) implementing that scheme. For example, both iSCSI and replication applications may use Ethernet to transmit data. Accordingly, iSCSI and replication applications, in that scenario, may share a peer link (114, 116) of a peer device (102, 104), meaning that each may transmit and/or receive data using the same physical port. Another example is multiple applications using the fibre channel protocol to send and/or receive data via a shared peer link (114, 116).

In one or more embodiments, a given application (not shown) may have a secure communication channel that is established to transmit and/or receive data between itself and a peer device (e.g., a corresponding application on another system). In one or more embodiments, a secure communication channel is a communication channel that is secured by being resistant to a third party being able to discover the content of the communication, and in which the two entities at either end of the communication channel are authenticated as being the appropriate participants in the data exchange.

In one or more embodiments, a peer link (114, 116) is a function of an address (e.g., IP address), network ID, and/or a virtual LAN ID (VLAN ID). In one or more embodiments, each peer link (114, 116) in a peer device (102, 114) may have similar or different of aforementioned attributes. In one or more embodiments, it is possible to have multiple different IP addresses associated with a single network ID, or to have multiple identical IP addresses on different network IDs. In one or more embodiments, a given peer link (114, 116) may have configured any number of virtual ports (not shown), each having some combination of the aforementioned attributes, which may or may not overlap with one another. In one or more embodiments, each such virtual port may have an associated construct referred to as a protocol interface (e.g., an IP interface) that is defined by the various attributes associated with a given physical port, which may be referred to as an interface information set.

In one or more embodiments, each interface may be associated with a separate protocol socket (e.g., a UDP socket). In one or more embodiments, such associations stand in contrast to having protocol sockets implemented per protocol interface rather than per port or IP address to interact with remote peers. Such a design may help a given application in choosing the correct socket with which to connect to remote systems (not shown), and may also alleviates any issues related to duplicate IP address assignments, duplicate network IDs, duplicate VLAN IDs, etc.

In one or more embodiments, applications (not shown) send and/or receive data, at least in part, via a communications layer (not shown), which is operatively connected to one or more applications (not shown). In one or more embodiments, a communications layer (not shown) is any hardware (e.g., circuitry), software, firmware, or any combination thereof that includes functionality to receive and/or transmit data between one or more applications (not shown) and a driver layer (not shown) (discussed further below). In one or more embodiments, the communications layer (not shown) includes, but is not limited to, at least a portion of a network stack. In one or more embodiments, a network stack is an implementation of a networking protocol or set of networking protocols that facilitate, at least in part, transmission of data between applications (not shown) and peer links (114, 116).

In one or more embodiments, the communications layer (not shown) communicates with peer links via a driver layer (not shown) via an operative connection to such physical ports. In one or more embodiments, a driver layer (not shown) is any hardware (e.g., circuitry), software, firmware, or any combination thereof that includes functionality to facilitate the sending and/or receiving of data via one or more peer links (114, 116). In one or more embodiments, a driver layer (not shown) includes any number of drivers for interacting with the peer links (114, 116) of the system (100).

In one or more embodiments, a peer link (114, 116) and/or a secure communications establisher (110, 112) are operatively connected to data transmission hardware (118, 120), which may be a portion of and/or operatively connected to the aforementioned communications layer (not shown). In one or more embodiments, data transmission hardware (118, 120) is hardware that includes, but is not limited to, functionality to be programmed with one or more security associations (described above). In one or more embodiments, programming data transmission hardware (118, 120) with a security association may allow for inline encryption of data being transmitted between peer devices, authentication of peer devices during data transmission, etc.

While FIG. 1 shows a configuration of components, other configurations may be used without departing from the scope of embodiments described herein. For example, there may be any number of per connection negotiators in a peer device. As another example, there may be any number of secure channel establishers in a peer device. As another example, there may be any number of peer links in a peer device. As another example, there may be any amount of data transmission hardware in a peer device. As another example, there may be any number of components, software instances, etc. that are not shown in FIG. 1. Accordingly, embodiments disclosed herein should not be limited to the configuration of components shown in FIG. 1.

Figure 2:
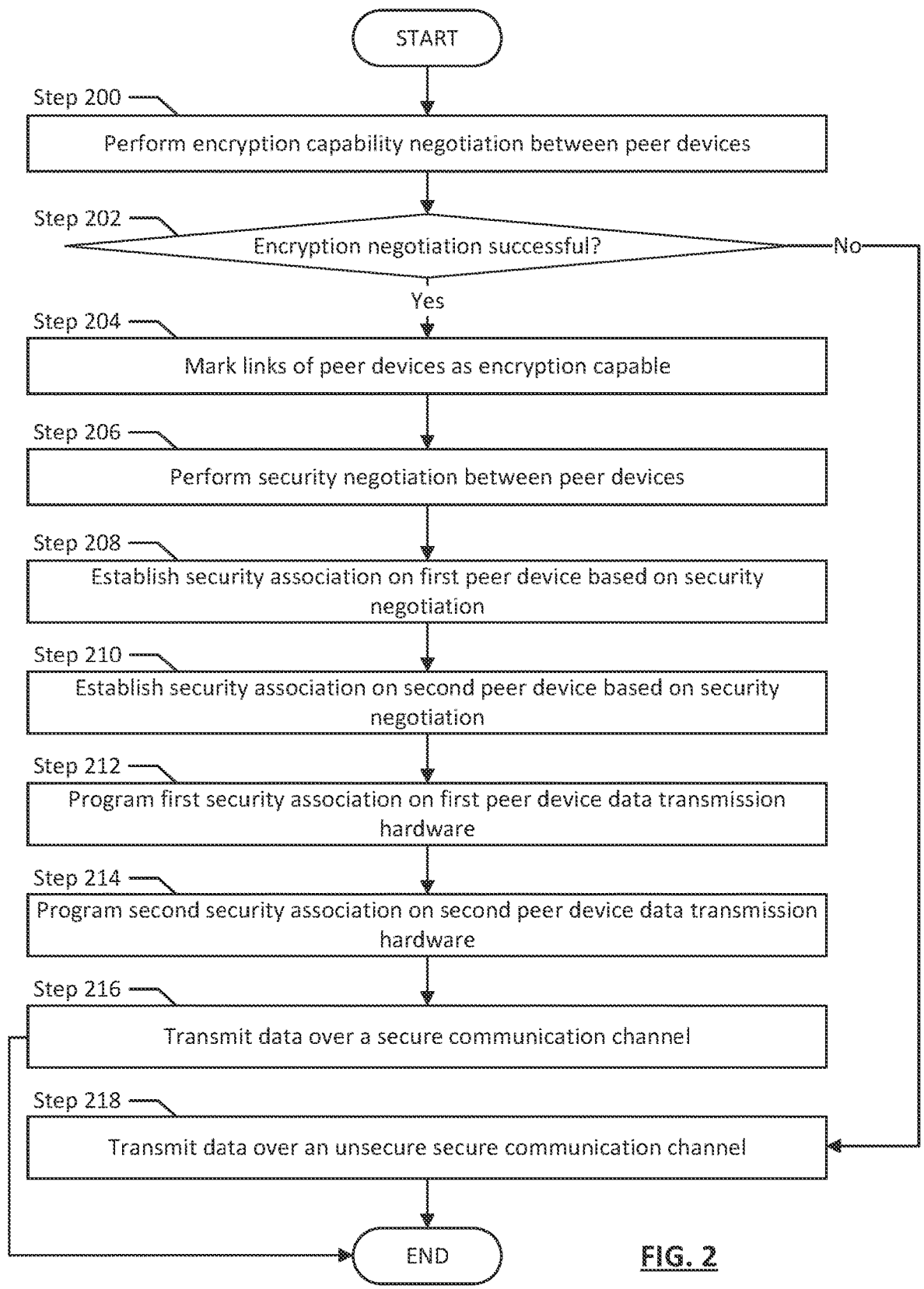
FIG. 2 shows a flowchart of a method in accordance with one or more embodiments of the invention.

FIG. 2 shows a flowchart describing a method for establishing secure communication channels in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, an encryption capability negotiation is performed between peer devices operatively connected by respective peer links. In one or more embodiments, the encryption capability negotiation includes establishing whether a set of peer devices all support one or more security features, such as security protocols (e.g., IPsec), key exchange protocols (e.g., IKE), compression algorithms, etc. In one or more embodiments, the encryption capability negotiation is performed via the exchange of messages of any sort that are able to convey from one peer device to another what capabilities a peer device has support for. For example, a message from one peer device to another may be a plain text message that includes a listing of supported capabilities for the peer link for which the negotiation is being undertaken. In one or more embodiments, the encryption capability negotiation is a part of establishing a communication channel between peer devices. In one or more embodiments, the negotiation is performed to establish whether a communication channel can or should be established as a secure communication channel, which may differ from other secure communication channel implementations, in which a secure communication channel is established prior to establishment of other aspects of a communication channel between peer devices (e.g., a TCP channel).

In Step 202, a determination is made as to whether the encryption capability negotiation of Step 200 was successful. In one or more embodiments, a successful encryption capability negotiation is one in which each peer device engaged in the negotiation has successfully communicated to the other that it supports relevant security capabilities. For example, each side may communicate to the other, at least, that it supports establishment of secure communication channels using the IPsec protocol. In one or more embodiments, an unsuccessful (i.e., a failure) encryption capability negotiation is one in which each peer device does not successfully communicate to the other that it supports the relevant security capabilities needed to establish a secure communication channel.

In one or more embodiments, a failure to successfully negotiate encryption capabilities is caused when one peer device lacks support for a given security capability. In such a scenario, an attempt to establish a secure communication channel with a non-supporting peer device may prevent and/or hinder the exchange of data with that peer device, which could otherwise proceed using a non-secured communication channel (e.g., in an unencrypted manner). Such a scenario may occur, for example, when a new peer device with updated security capabilities is operatively connected and intended to exchange data with an older peer device lacking the same security capabilities.

Additionally or alternatively, a failure to successfully negotiate encryption capabilities may be caused because some other device situated between the peer links of the peer devices alters or prevents transmission of the capability messages between the peer devices. One non-limiting example of such a device is a WAN optimizer. In one or more embodiments, a WAN optimizer is configured as a system of WAN devices in a WAN that are configured to perform such functionality as encryption, compression, etc. For example, a given peer device may be operatively connected to a first WAN device, which is operatively connected to a second WAN device, which is operatively connected to the remote peer device. In such a scenario, the pair of WAN devices are configured to perform encryption, compression, and/or other services within the WAN. Accordingly, in systems in which WAN optimization in implemented, it may be disadvantageous to also implement a secure channel between peer devices, as such a secure communication channel may, for example, encrypt network traffic, which would again be encrypted by a WAN device (thereby becoming 'double encrypted'), which would require two rounds of de-encryption on the other side of the data transmission. Such a scenario may, for example, introduce an unacceptable, unnecessary, and/or unwanted amount of latency to a given communication channel.

If the encryption capability negotiation fails, the peer links involved in the encryption capability negotiation are marked as non-encryption capable, and the method proceeds to Step 218. If, on the other hand, the encryption capability negotiation is successful, the method proceeds to Step 204.

In Step 204, the peer links on each of the peer devices participating in the encryption capability negotiation are marked as encryption capable links. In one or more embodiments, a peer link may be marked as encryption capable using any method of assigning an attribute to an entity. For example, a value may be input into a data repository entry for the peer link that indicates that the peer link is encryption capable. Other methods for marking a peer link as encryption capable may be used without departing from the scope of embodiments described herein.

In Step 206, a security negotiation is performed between the peer devices. In one or more embodiments, the security negotiation begins with the secure channel establishers on each of the peer devices making a determination as to which side of the peer relationship is an initiator and which side is a responder. Such a determination may be necessary to facilitate further security negotiation, where one side of the peer relationship needs to start the negotiation. For example, during an IKE negotiation, there should be an initiator side that sends the initial message to the responder side, which responds with a corresponding message. The exchange of messages then continues between the initiator side and responder side until the security negotiation is complete. As discussed above in the description of FIG. 1, the designation of one peer connection negotiator as the initiator and the other as the responder may be performed in a variety of ways, such as selecting the peer that send the first encryption capability negotiation message as the initiator, selecting the peer device with the highest serial number as the initiator, etc. In one or more embodiments, designation of an initiator peer and a responder peer may help avoid the establishment of unnecessarily redundant secure communication channels between peer devices that are each configured to discover the pother without the concept of one side or the other being an initiating or responding peer device. In one or more embodiments, once the identity of the initiator and the responder has been established, a protocol, such as the IKE protocol, is used to negotiate various security parameters, via several message exchanges to exchange information such as supported encryption and authentication algorithms, Diffie-Hellman information, digital certificates for authentication, etc.

In Step 208, the security negotiation of Step 206 yields a security association on a first peer for the peer link on that peer device. As discussed above in the description of FIG. 1, in one or more embodiments, a security association is a logical group of security parameters that enable the secure sharing of information with another entity. As such, a security association may, for example, include encryption key information, peer authentication information, etc.

In Step 210, similar to Step 210, a security association is established on the second peer for the peer link on that peer device.

In Step 212, the security association established for a first peer of the peer relationship is programmed to hardware (e.g., data transmission hardware) of the first peer device. For example, the one or more security keys to be used for the secure communication channel may be programmed to hardware for performing inline data encryption/decryption during data exchange with a second peer device.

In Step 214, similar to Step 212, the security association for the second peer of the peer relationship is programmed to hardware (e.g., data transmission hardware) of the second peer device.

In Step 216, based on the successful establishment of a secure communication channel between two peer links of two peer devices, data is transmitted over a secure communication channel Such data may, for example, being encrypted inline by data transmission hardware using the programmed security association on each peer device.

In Step 218, based on the failure of the encryption capability negotiation as determined in Step 202, data may be transmitted over an unsecure communication channel. For example, data may be transmitted without encryption and/or authentication.

Figure 3:
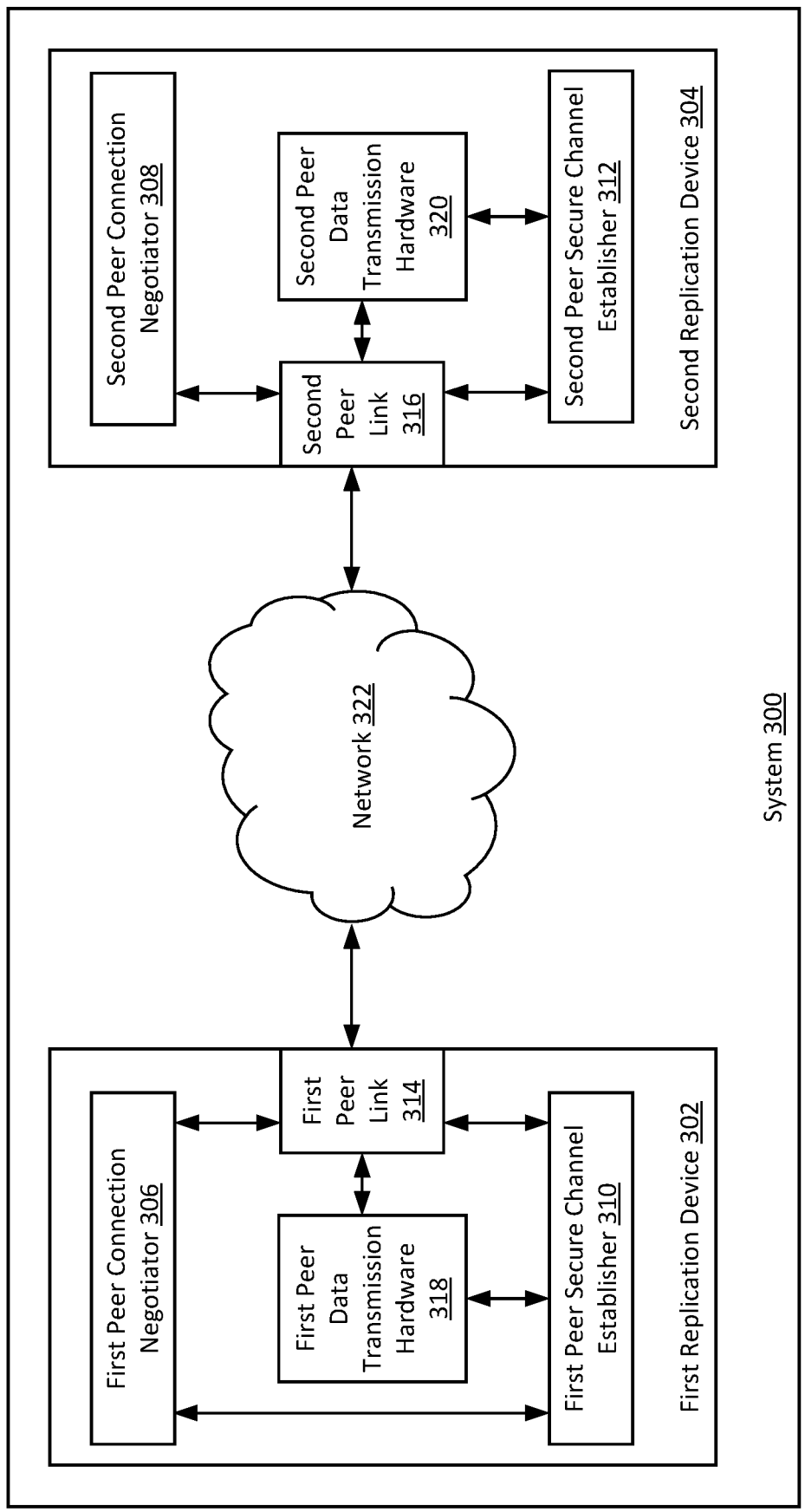
FIG. 3 shows a diagram of an example system in accordance with one or more embodiments of the invention.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which a system (300) includes two peer replication devices (302, 304). The first peer replication device (302) includes a first peer connection negotiator (306), a first peer secure channel establisher (310), a first peer link (314), and first peer data transmission hardware (318). The second peer replication device (304) includes a second peer connection negotiator (308), a second peer secure channel establisher (312), a second peer link (316), and second peer data transmission hardware (320). The replication devices (302, 304) are operatively connected, at least in part, by a network (322).

In this scenario, the first peer connection negotiator (306) sends a message to the second peer connection negotiator (308) using the first peer link (314), the network (322), and the second peer link (316). The message includes the security capabilities of the first replication device, which includes support for the IPsec protocol, and, in particular, the IKE protocol.

In response, the second peer connection negotiator (306) sends a message to the first peer connection negotiator (308) using the second peer link (316), the network (322), and the first peer link (314). The message includes the security capabilities of the second replication device, which includes support for the IPsec protocol, and, in particular, the IKE protocol.

Because the connection negotiators established that both replication devices support IPsec and IKE, the encryption capability negotiation is successful. In response to the success of the negotiation, the first peer link (314) and the second peer link (316) are respectively marked as encryption capable. Additionally, because the first peer connection negotiator (306) sent the initial message of the encryption capability negotiation, each of the first peer secure channel establisher (310) and the second peer secure channel establisher (312) mark the first peer connection negotiator (306) as the initiator and mark the second peer connection negotiator (308) as the responder.

Next, the secure channel establishers (310, 312) use the IKE protocol to exchange several messages such as supported encryption and authentication algorithms, Diffie-Hellman information, digital certificates for authentication etc. After successful IKE session symmetric keys for data encryption (decryption) and authentication are derived on both ends, the IKE sessions are established on per connection basis between replication device peers (e.g., derived symmetric encryption keys differs for every connection between every local and remote peer).

After the IKE protocol generates the shared secret keys for data authentication and encryption between local and remote peers, the derived keys for the security associations are unidirectional (i.e. there will be two security associations generated for every IKE session, and each session consists of unique encryption and authentication keys). The derived data encryption keys after successful IKE sessions are programmed to the (318, 320) hardware on both replication local and remote ends in order to perform inline data encryption/decryption.

Consider a second scenario in which the aforementioned encryption capability negotiation determined that the second replication device, which was an older replication device, did not support IPsec or IKE protocols. In such a scenario, a secure communication channel would not be established between the first and second replication channels, but data is still communicated over an unsecure communication channel.

Consider a third scenario in which the aforementioned encryption capability negotiation failed because WAN optimization was implemented between the first replication device and the second replication device (e.g., the WAN devices prevented successful exchange of matching security capability support). In such a scenario, an end-to-end secure communication channel between the first replication device and the second replication device is not established. Instead, unsecured data is transmitted from the first replication to a first WAN device (not shown), where any security implementation occurs. Secured traffic is then sent to a second WAN device, where the secured traffic is decrypted, decompressed, etc. before being send to the second replication device.

Thus, as illustrated in FIG. 3, embodiments described herein may provide a method for establishing secure communications channels for various applications, allowing applications to consistently and reliably establish secure communication channels only when corresponding peer devices have appropriate support for the same and/or there are no interposed WAN optimization devices.

Figure 4:
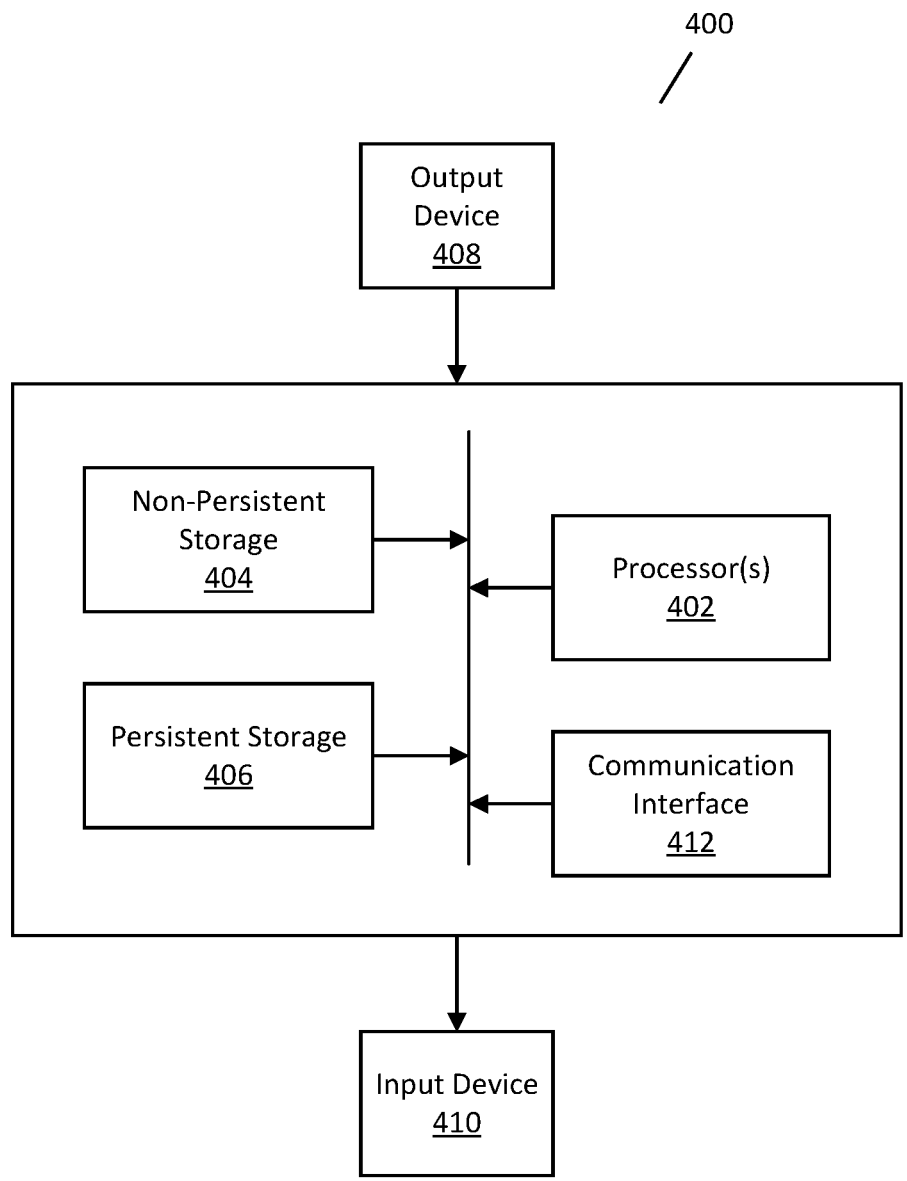
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide an efficient establishment of secure communication channels that takes into account the capabilities of peer devices and/or the existence of WAN optimization schemes before attempting to establish the secure communication channels, which may result in more successful instances and/or more efficient instances of communication channels between peer devices.

The problems discussed above should be understood as being examples of problems solved by embodiments of the invention of the invention and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for establishing a secure communication channel, the method comprising:
    performing an encryption capability negotiation between a first peer device and a second peer device, wherein the first peer device and the second peer device are operatively connected by a first communication channel comprising a first link of the first peer device and a second link of the second peer device;
    marking, when the encryption capability negotiation is successful, the first link and the second link as encryption capable;
    performing, when the encryption capability negotiation is successful, a first security negotiation between the first peer device and the second peer device;
    in response to the first security negotiation:
        establishing a first security association on the first peer device; and
        establishing a second security association on the second peer device;
    programming the first security association to first data transmission hardware of the first peer device;
    programming the second security association to second data transmission hardware of the second peer device; and
    exchanging data using the first communication channel, which is unsecured, when the encryption capability negotiation is a failure as a result of determining that the second link of the second peer device is non-encryption capable.

2. The method of claim 1, wherein the first security negotiation comprises designating the first peer device as an initiator and the second peer device as a responder.

3. The method of claim 2, wherein designating the first peer device as the initiator and the second peer device as the responder comprises making a determination that the first peer device initiated the encryption capability negotiation.

4. The method of claim 2, wherein designating the first peer device as the initiator and the second peer device as the responder comprises making a determination that a first identifier of the first peer device has a higher value than a second identifier of the second peer device.

5. The method of claim 1, wherein, when the encryption capability negotiation is a failure, the failure is a result of a Wide Area Network (WAN) optimizer being present within the first communication channel between the first peer device and the second peer device.

6. The method of claim 1, wherein programming the first security association and the second security association makes the first communication channel between the first peer device and the second peer device the secure communication channel.

7. The method of claim 1, wherein:
    the first peer device and the second peer device are further operatively connected by a second communication channel comprising a third link of the first peer device and a fourth link of the second peer device, and
    the method further comprises performing a second security negotiation for the second communication channel.

8. The method of claim 1, wherein the first peer device and the second peer device are replication devices.

9. A non-transitory computer readable medium comprising computer readable program code, which when executed by a computer processor enables the computer processor to perform a method for establishing a secure communication channel comprising:
    performing an encryption capability negotiation between a first peer device and a second peer device, wherein the first peer device and the second peer device are operatively connected by a first communication channel comprising a first link of the first peer device and a second link of the second peer device;
    marking, when the encryption capability negotiation is successful, the first link and the second link as encryption capable;
    performing, when the encryption capability negotiation is successful, a first security negotiation between the first peer device and the second peer device;
    in response to the first security negotiation:
        establishing a first security association on the first peer device; and
        establishing a second security association on the second peer device;
    programming the first security association to first data transmission hardware of the first peer device;
    programming the second security association to second data transmission hardware of the second peer device; and
    exchanging data using the first communication channel, which is unsecured, when the encryption capability negotiation is a failure as a result of determining that the second link of the second peer device is non-encryption capable.

10. The non-transitory computer readable medium of claim 9, wherein the first security negotiation comprises designating the first peer device as an initiator and the second peer device as a responder.

11. The non-transitory computer readable medium of claim 10, wherein designating the first peer device as the initiator and the second peer device as the responder comprises making a determination that the first peer device initiated the encryption capability negotiation.

12. The non-transitory computer readable medium of claim 10, wherein designating the first peer device as the initiator and the second peer device as the responder comprises making a determination that a first identifier of the first peer device has a higher value than a second identifier of the second peer device.

13. The non-transitory computer readable medium of claim 9, wherein, when the encryption capability negotiation is a failure, the failure is a result of a Wide Area Network (WAN) optimizer being present within the first communication channel between the first peer device and the second peer device.

14. The non-transitory computer readable medium of claim 9, wherein programming the first security association and the second security association makes the first communication channel between the first peer device and the second peer device the secure communication channel.

15. The non-transitory computer readable medium of claim 9, wherein:
the first peer device and the second peer device are further operatively connected by a second communication channel comprising a third link of the first peer device and a fourth link of the second peer device, and
the method further comprises performing a second security negotiation for the second communication channel.

16. The non-transitory computer readable medium of claim 9, wherein the first peer device and the second peer device are replication devices.

\* \* \* \* \*